(12) United States Patent
Kuruma

(10) Patent No.: US 11,094,470 B2
(45) Date of Patent: Aug. 17, 2021

(54) MULTILAYER CERAMIC CAPACITOR

(71) Applicant: Murata Manufacturing Co., Ltd., Nagaokakyo (JP)

(72) Inventor: Ichiro Kuruma, Nagaokakyo (JP)

(73) Assignee: MURATA MANUFACTURING CO., LTD., Kyoto (JP)

( * ) Notice: Subject to any disclaimer, the term of this patent is extended or adjusted under 35 U.S.C. 154(b) by 71 days.

(21) Appl. No.: 16/783,195

(22) Filed: Feb. 6, 2020

(65) Prior Publication Data
US 2020/0265999 A1 Aug. 20, 2020

(30) Foreign Application Priority Data
Feb. 20, 2019 (JP) .............................. JP2019-028173

(51) Int. Cl.
| | | |
|---|---|---|
| *H01G 4/012* | (2006.01) | |
| *H01G 4/30* | (2006.01) | |
| *H01G 2/02* | (2006.01) | |
| *H01G 4/12* | (2006.01) | |

(52) U.S. Cl.
CPC ............. *H01G 4/30* (2013.01); *H01G 2/02* (2013.01); *H01G 4/012* (2013.01); *H01G 4/1209* (2013.01)

(58) Field of Classification Search
None
See application file for complete search history.

(56) References Cited

U.S. PATENT DOCUMENTS

| | | | | |
|---|---|---|---|---|
| 5,880,925 | A * | 3/1999 | DuPre | H05K 3/3442 361/303 |
| 6,052,272 | A * | 4/2000 | Kuroda | H01G 4/30 361/303 |
| 6,563,689 | B2 * | 5/2003 | Yamamoto | H01G 4/232 361/306.1 |
| 7,133,274 | B2 * | 11/2006 | Hidaka | H01G 4/012 361/303 |
| 7,333,318 | B2 * | 2/2008 | Hidaka | H01G 4/12 361/306.1 |
| 7,995,325 | B2 * | 8/2011 | Togashi | H01G 4/012 361/303 |
| 10,121,596 | B2 * | 11/2018 | Ota | H01G 4/232 |
| 2003/0011962 | A1 * | 1/2003 | Yamamoto | H01G 4/30 361/321.2 |

(Continued)

FOREIGN PATENT DOCUMENTS

JP 8-37126 A 2/1996

*Primary Examiner* — Dion Ferguson
(74) *Attorney, Agent, or Firm* — Keating & Bennett, LLP

(57) ABSTRACT

A multilayer ceramic capacitor includes a stacked body including dielectric layers and internal electrodes. External electrodes are provided on end surfaces of the stacked body. The internal electrodes include a first internal electrode, a second internal electrode, a third internal electrode, a fourth internal electrode, a fifth internal electrode, and a sixth internal electrode. The first internal electrode and the second internal electrode, and the third internal electrode and the fourth internal electrode are provided on a dielectric layer in a same plane, and the fifth internal electrode and the sixth internal electrode are provided on a dielectric layer in a same plane different from the dielectric layer on which the first internal electrode and the second internal electrode, and the third internal electrode and the fourth internal electrode are provided.

17 Claims, 11 Drawing Sheets

(56) References Cited

U.S. PATENT DOCUMENTS

| | | | | |
|---|---|---|---|---|
| 2006/0044732 A1* | 3/2006 | Shimizu | ............... | H01G 4/18 |
| | | | | 361/303 |
| 2007/0058326 A1* | 3/2007 | Hidaka | ............... | H01G 4/30 |
| | | | | 361/311 |
| 2010/0008017 A1* | 1/2010 | Ito | ............... | H01G 4/012 |
| | | | | 361/301.4 |
| 2011/0024175 A1* | 2/2011 | Satou | ............... | H01G 2/065 |
| | | | | 174/260 |
| 2011/0128665 A1* | 6/2011 | Nies | ............... | C04B 35/62685 |
| | | | | 361/301.4 |
| 2013/0100576 A1* | 4/2013 | Seo | ............... | H01G 4/005 |
| | | | | 361/301.4 |
| 2014/0160625 A1* | 6/2014 | Jang | ............... | H01G 4/232 |
| | | | | 361/301.4 |
| 2015/0041197 A1* | 2/2015 | Lee | ............... | H01G 4/30 |
| | | | | 174/260 |
| 2015/0143644 A1* | 5/2015 | Yamada | ............... | B08B 9/083 |
| | | | | 15/4 |
| 2016/0111216 A1* | 4/2016 | Lee | ............... | H01G 4/012 |
| | | | | 361/301.4 |
| 2016/0158825 A1* | 6/2016 | Inoshita | ............... | H01L 21/4882 |
| | | | | 29/890.03 |
| 2018/0012706 A1* | 1/2018 | Bultitude | ............... | H01G 4/002 |
| 2019/0279820 A1* | 9/2019 | Horn | ............... | H01G 4/248 |

\* cited by examiner

MULTILAYER CERAMIC CAPACITOR

CROSS REFERENCE TO RELATED APPLICATIONS

This application claims the benefit of priority to Japanese Patent Application No. 2019-028173 filed on Feb. 20, 2019. The entire contents of this application are hereby incorporated herein by reference.

BACKGROUND OF THE INVENTION

1. Field of the Invention

The present invention relates to a multilayer ceramic capacitor having a high capacitance.

2. Description of the Related Art

In recent years, as electronic products are downsized and have more functions, chip components also tend to be downsized and have a higher functionality. Thus, also in a multilayer ceramic capacitor, a high-capacitance product having a small size and a large capacitance is required. Accordingly, a multilayer ceramic capacitor including a larger number of stacked dielectric layers and internal electrodes having thinner thicknesses is manufactured.

However, if a voltage per unit thickness increases as each dielectric layer becomes thinner, breakdown occurs in the dielectric layer, and thus thinning of each dielectric layer is not suitable for a high breakdown voltage design. It is generally known that there is no proportional relationship between the thickness of a dielectric layer and a breakdown voltage, and even though the thickness of the dielectric layer is doubled for the high breakdown voltage design, the breakdown voltage is not doubled. Therefore, it is not possible to increase the breakdown voltage by an amount corresponding to an increase in the thickness of the dielectric layer.

As a technique for solving the aforementioned problem, for example, a structure of internal electrodes as described in Japanese Patent Laid-Open No. H08-37126 may be adopted. By adopting a structure in which the internal electrodes have a plurality of divided facing portions as described above, a plurality of capacitor components are formed between the internal electrodes facing each other, and these capacitor components are connected in series. Therefore, a voltage to be applied to each capacitor component can be decreased, and thus a multilayer ceramic capacitor can have a high breakdown voltage. As a result, breakdown voltage characteristics of the multilayer ceramic capacitor can be improved.

However, when the internal electrodes have divided facing portions as in Japanese Patent Laid-Open No. H08-37126, the number of internal electrodes extending to the outside of an element (a stacked body) decreases. In other words, as the internal electrodes have more divided facing portions, the number of internal electrodes that are not extended to the outside of the element (stacked body) increases. Thus, especially in a multilayer ceramic capacitor through which a large current flows, when power consumption resulting from a loss component increases and self-heating occurs, the number of heat dissipation paths to the outside of the element (stacked body) decreases, which causes deterioration of heat dissipation properties. As a result, deterioration of heat dissipation properties causes an increase in heat generation temperature, which causes a decrease in the reliability of the multilayer ceramic capacitor.

SUMMARY OF THE INVENTION

Preferred embodiments of the present invention provide multilayer ceramic capacitors each having excellent reliability by improving heat dissipation properties while providing a high breakdown voltage design.

A multilayer ceramic capacitor according to a preferred embodiment of the present invention includes a stacked body including a plurality of stacked dielectric layers and a plurality of stacked internal electrodes, and including a first main surface and a second main surface opposite to each other in a stacking direction, a first side surface and a second side surface opposite to each other in a width direction orthogonal or substantially orthogonal to the stacking direction, and a first end surface and a second end surface opposite to each other in a length direction orthogonal or substantially orthogonal to the stacking direction and the width direction; a first external electrode on the first end surface; and a second external electrode on the second end surface, the internal electrodes including a first internal electrode and a second internal electrode, a third internal electrode and a fourth internal electrode, and a fifth internal electrode and a sixth internal electrode, the first internal electrode and the second internal electrode, and the third internal electrode and the fourth internal electrode are provided on a dielectric layer in a same plane, the fifth internal electrode and the sixth internal electrode are provided on a dielectric layer in a same plane different from the dielectric layer on which the first internal electrode and the second internal electrode, and the third internal electrode and the fourth internal electrode are provided, the first internal electrode including a first drawn-out portion with one end portion extending to the first end surface, a first facing portion connected to the first drawn-out portion and overlapping with the fifth internal electrode on the different dielectric layer, and a second facing portion extending from the first facing portion toward the second end surface and having a width narrower than that of the first facing portion, the second internal electrode including a second drawn-out portion with one end portion extending to the second end surface, a third facing portion connected to the second drawn-out portion and overlapping with the sixth internal electrode on the different dielectric layer, and a fourth facing portion extending from the third facing portion toward the first end surface and having a width narrower than that of the third facing portion, the third internal electrode being spaced away from the first internal electrode and the second internal electrode, and including a fifth facing portion overlapping with the fifth internal electrode on the dielectric layer different from the dielectric layer on which the third internal electrode is provided, and a sixth facing portion overlapping with the sixth internal electrode on the dielectric layer different from the dielectric layer on which the third internal electrode is provided, the fourth internal electrode being spaced away from the first internal electrode and the second internal electrode, and including a seventh facing portion overlapping with the fifth internal electrode on the dielectric layer different from the dielectric layer on which the fourth internal electrode is provided, and an eighth facing portion overlapping with the sixth internal electrode on the dielectric layer different from the dielectric layer on which the fourth internal electrode is provided, the fifth internal electrode straddling the first internal electrode, the third internal electrode, and the fourth internal electrode, the sixth internal electrode straddling the second internal electrode, the third internal electrode, and the fourth internal electrode, the fifth internal electrode and the sixth internal electrode being separated from each other.

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

Preferred embodiments of the present invention will be described in detail with reference to the accompanying drawings.

1. Multilayer Ceramic Capacitor

Figure 1:
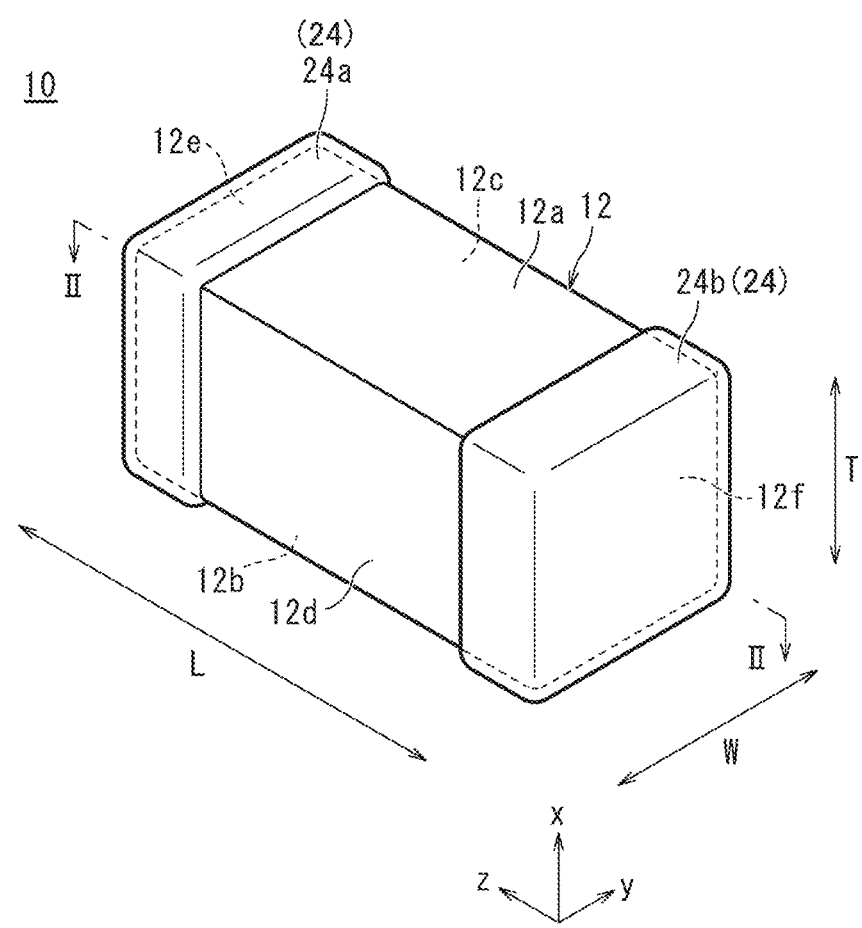
FIG. 1 is an external perspective view showing an example of a multilayer ceramic capacitor according to a preferred embodiment of the present invention.
Figure 2:
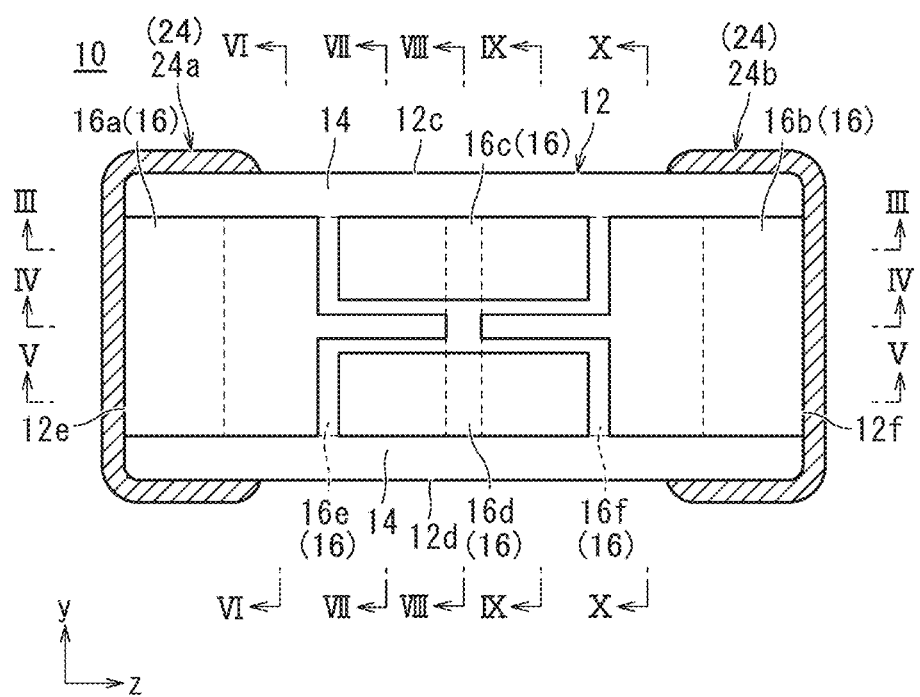
FIG. 2 is a cross sectional view of the multilayer ceramic capacitor shown in FIG. 1, taken along a line II-II.
Figure 3:
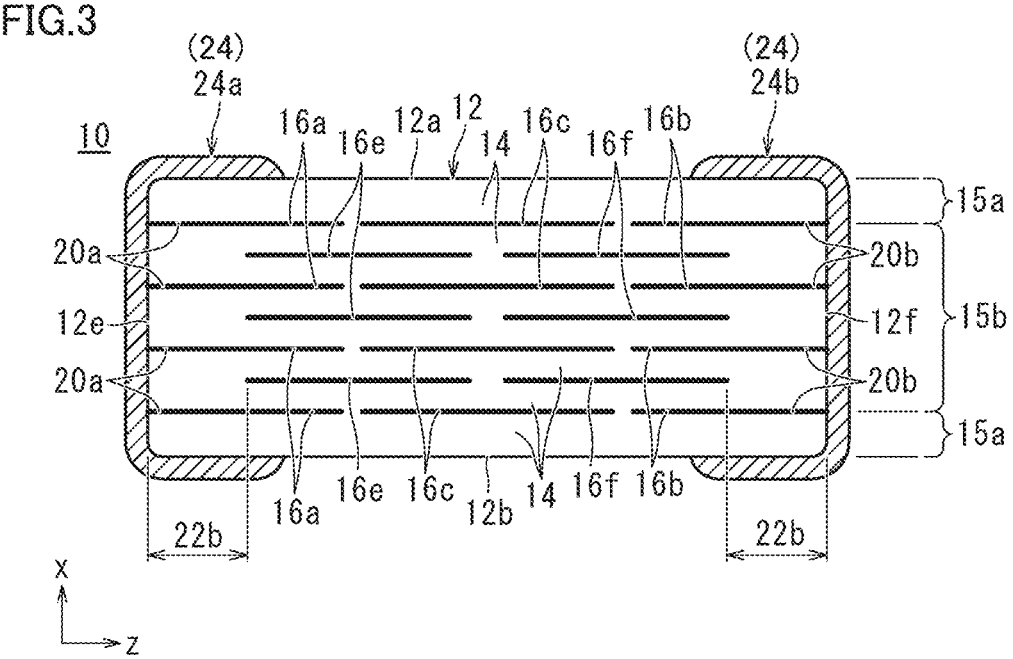
FIG. 3 is a cross sectional view of the multilayer ceramic capacitor shown in FIG. 2, taken along a line III-III.
Figure 4:
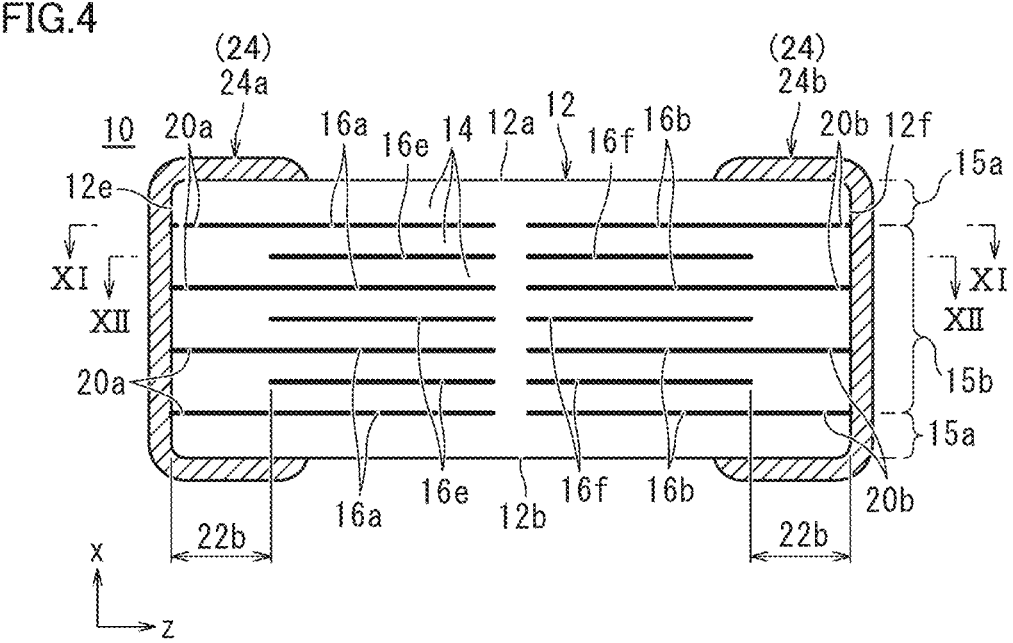
FIG. 4 is a cross sectional view of the multilayer ceramic capacitor shown in FIG. 2, taken along a line IV-IV.
Figure 5:
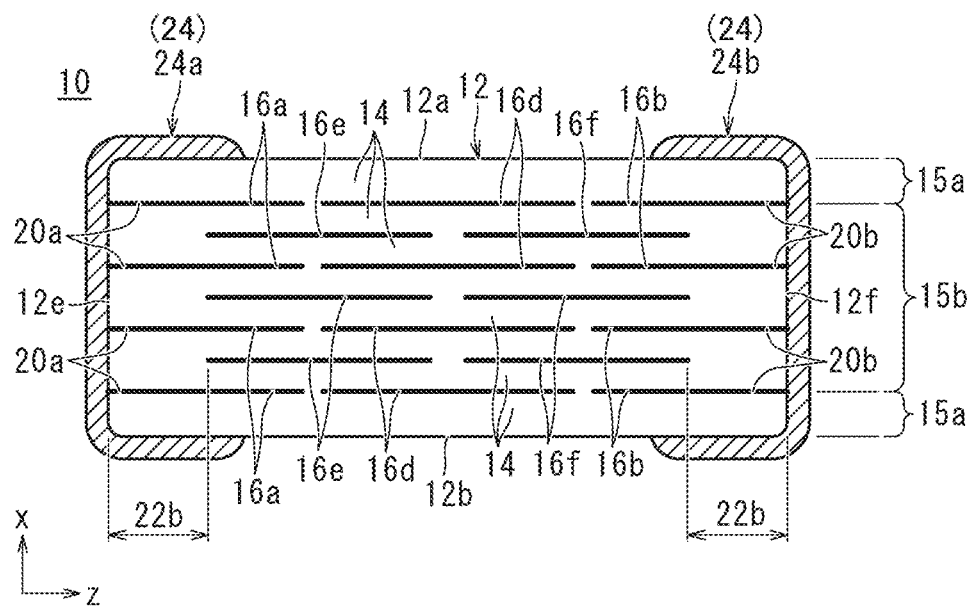
FIG. 5 is a cross sectional view of the multilayer ceramic capacitor shown in FIG. 2, taken along a line V-V.
Figure 6:
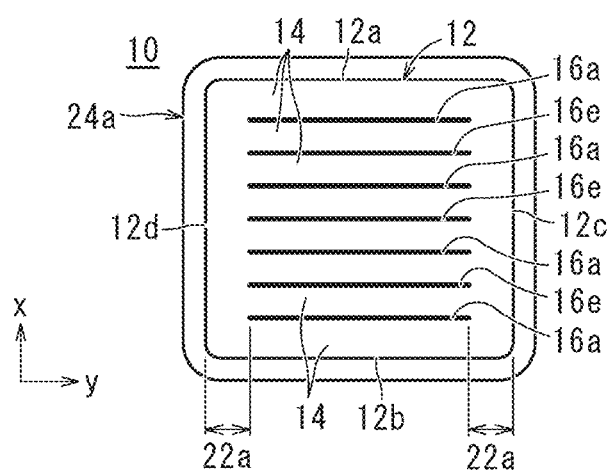
FIG. 6 is a cross sectional view of the multilayer ceramic capacitor shown in FIG. 2, taken along a line VI-VI.
Figure 7:
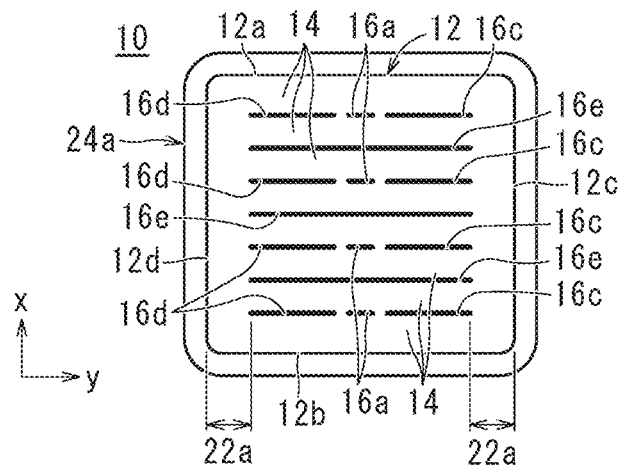
FIG. 7 is a cross sectional view of the multilayer ceramic capacitor shown in FIG. 2, taken along a line VII-VII.
Figure 8:
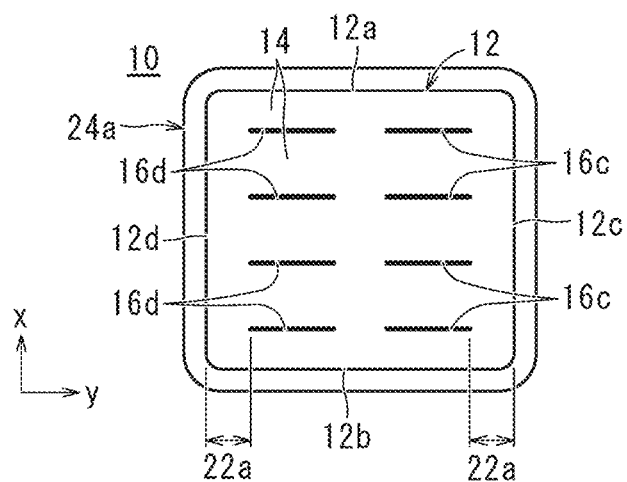
FIG. 8 is a cross sectional view of the multilayer ceramic capacitor shown in FIG. 2, taken along a line VIII-VIII.
Figure 9:
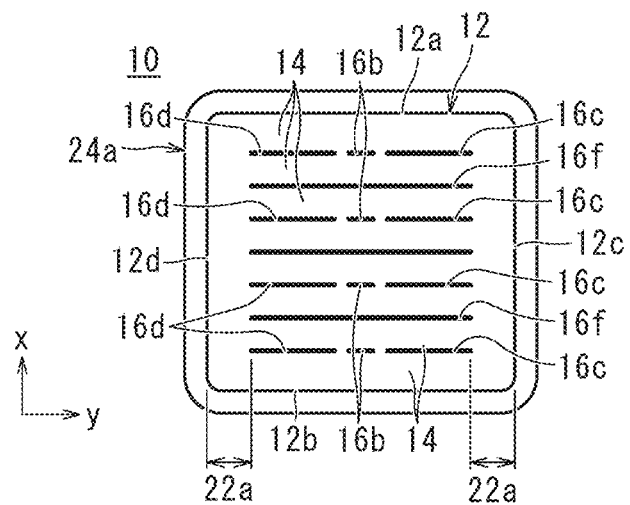
FIG. 9 is a cross sectional view of the multilayer ceramic capacitor shown in FIG. 2, taken along a line IX-IX.
Figure 10:
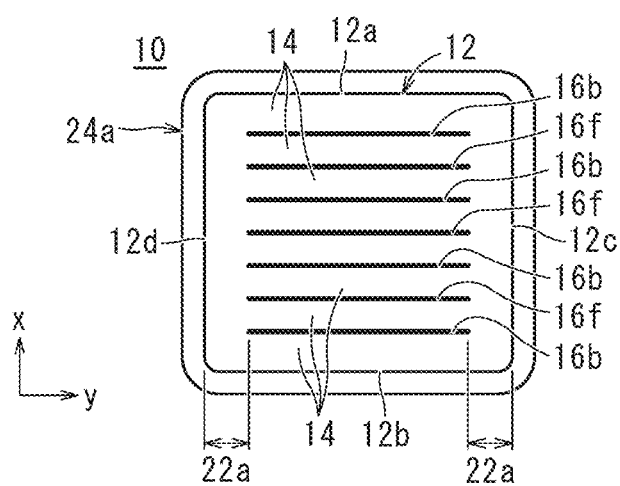
FIG. 10 is a cross sectional view of the multilayer ceramic capacitor shown in FIG. 2, taken along a line X-X.
Figure 11:
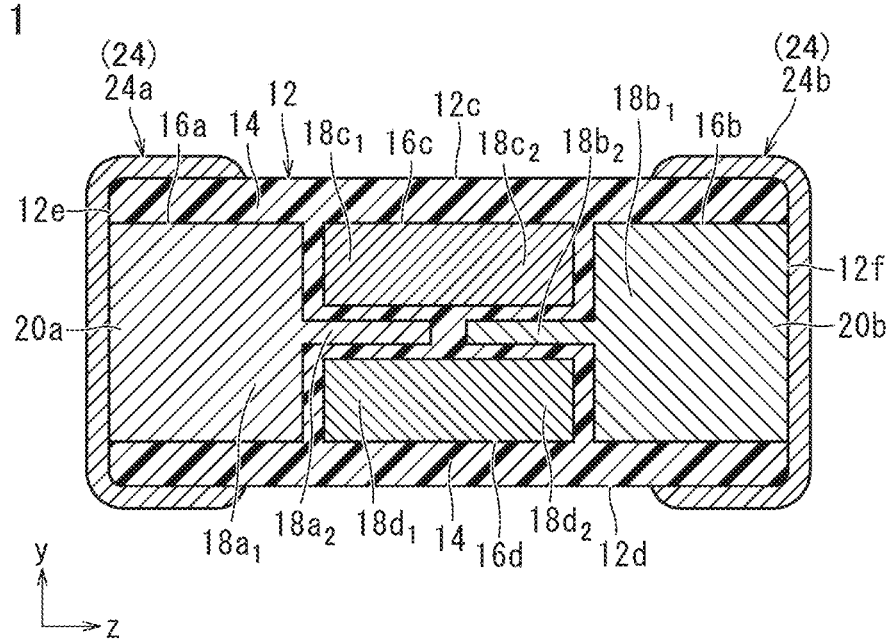
FIG. 11 is a cross sectional view of the multilayer ceramic capacitor shown in FIG. 4, taken along a line XI-XI.
Figure 12:
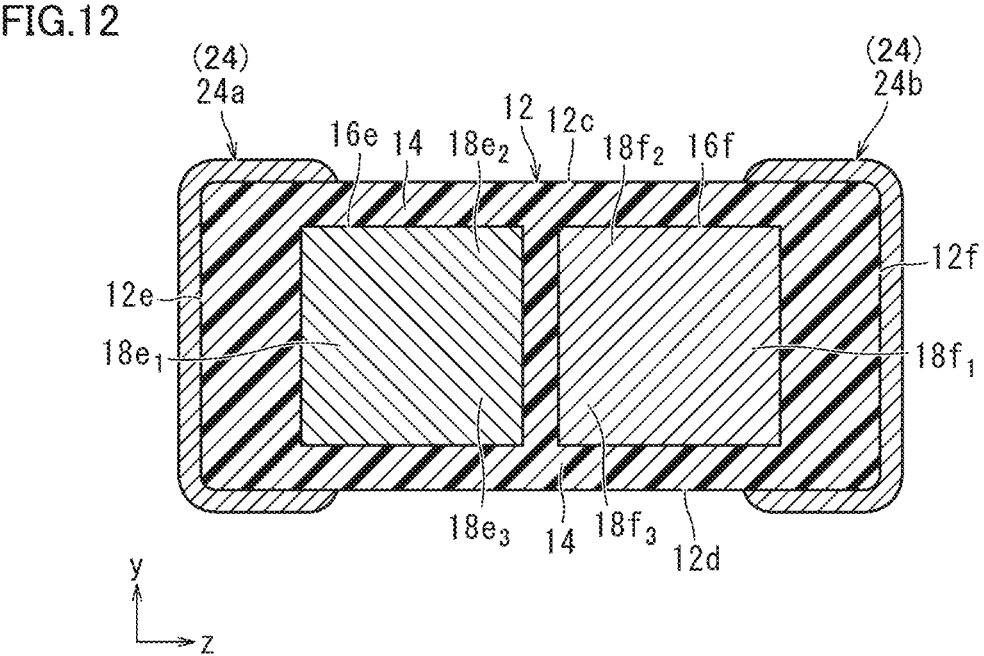
FIG. 12 is a cross sectional view of the multilayer ceramic capacitor shown in FIG. 4, taken along a line XII-XII.
Figure 13:
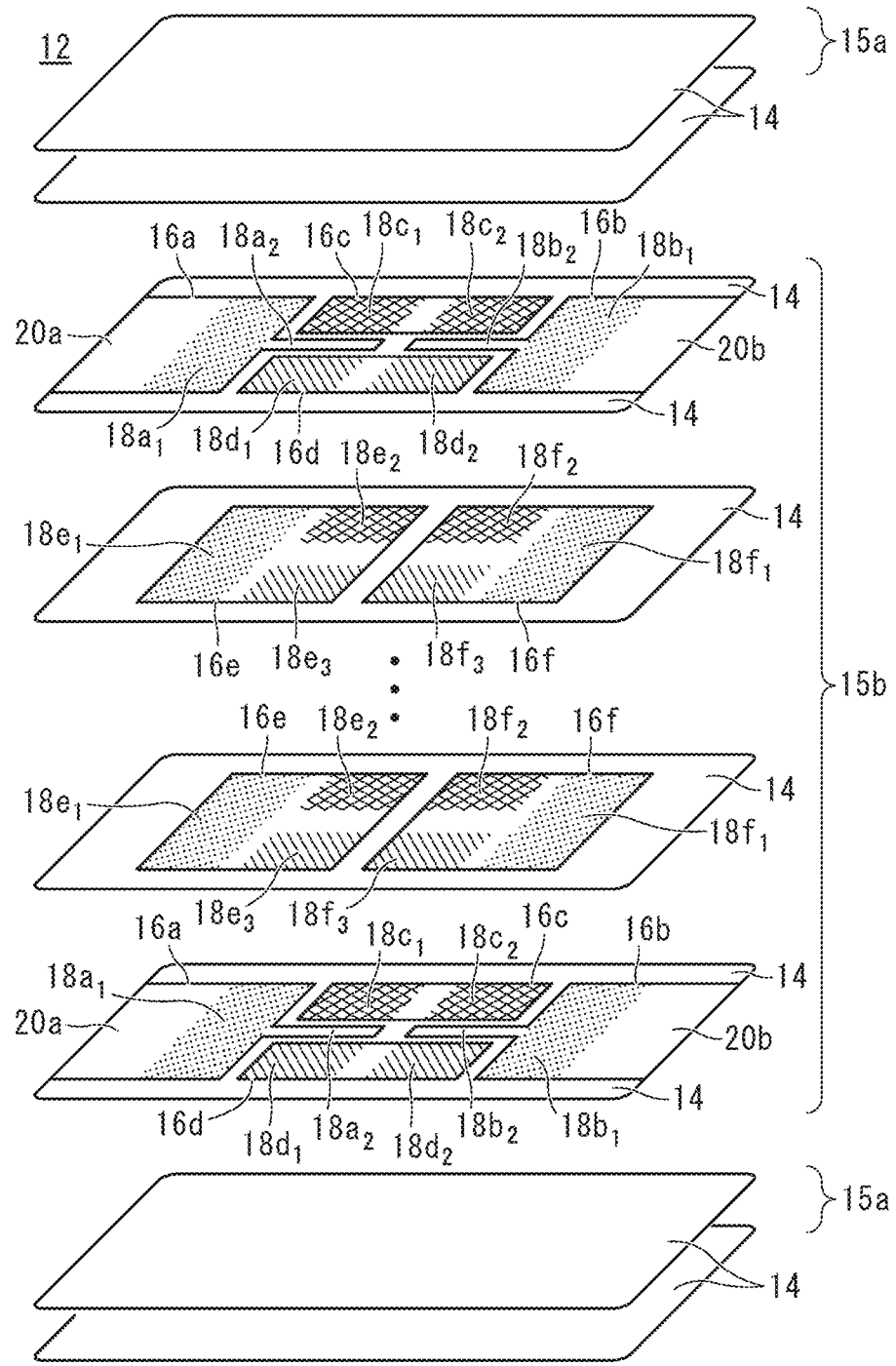
FIG. 13 is an exploded perspective view of a stacked body shown in FIG. 1.
Figure 14:
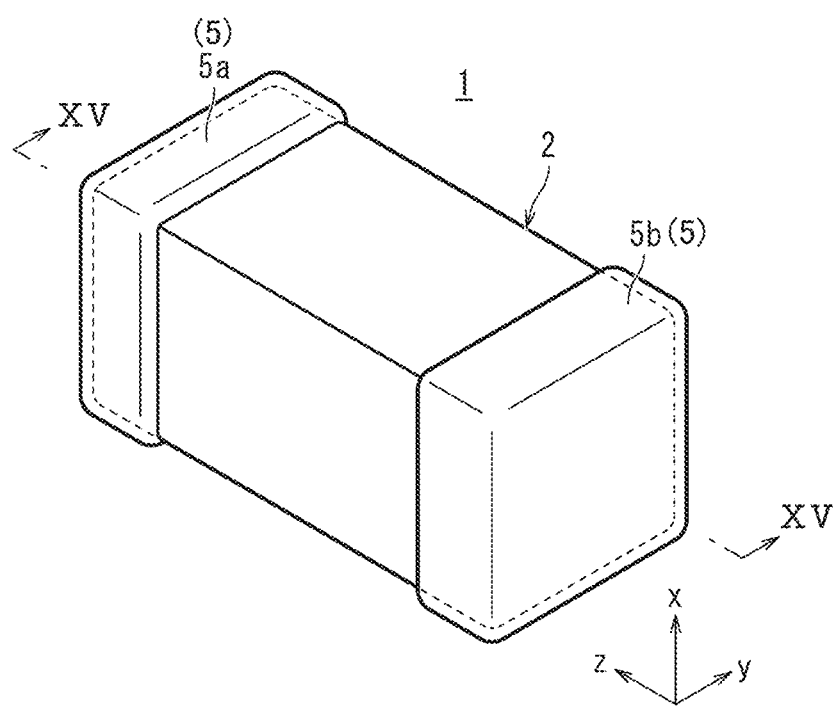
FIG. 14 is an external perspective view of a multilayer ceramic capacitor according to a Comparative Example.

A multilayer ceramic capacitor according to a preferred embodiment of the present invention will be described. FIG. 1 is an external perspective view showing an example of the multilayer ceramic capacitor according to the present preferred embodiment. FIG. 2 is a cross sectional view of the multilayer ceramic capacitor shown in FIG. 1, taken along a line II-II. FIG. 3 is a cross sectional view of the multilayer ceramic capacitor shown in FIG. 2, taken along a line III-III. FIG. 4 is a cross sectional view of the multilayer ceramic capacitor shown in FIG. 2, taken along a line IV-IV. FIG. 5 is a cross sectional view of the multilayer ceramic capacitor shown in FIG. 2, taken along a line V-V. FIG. 6 is a cross sectional view of the multilayer ceramic capacitor shown in FIG. 2, taken along a line VI-VI. FIG. 7 is a cross sectional view of the multilayer ceramic capacitor shown in FIG. 2, taken along a line VII-VII. FIG. 8 is a cross sectional view of the multilayer ceramic capacitor shown in FIG. 2, taken along a line VIII-VIII. FIG. 9 is a cross sectional view of the multilayer ceramic capacitor shown in FIG. 2, taken along a line IX-IX. FIG. 10 is a cross sectional view of the multilayer ceramic capacitor shown in FIG. 2, taken along a line X-X. FIG. 11 is a cross sectional view of the multilayer ceramic capacitor shown in FIG. 4, taken along a line XI-XI. FIG. 12 is a cross sectional view of the multilayer ceramic capacitor shown in FIG. 4, taken along a line XII-XII. FIG. 13 is an exploded perspective view of a stacked body shown in FIG. 1.

As shown in FIGS. 1 to 3, a multilayer ceramic capacitor 10 includes a stacked body 12 having a rectangular or substantially rectangular parallelepiped shape.

Stacked body 12 includes a plurality of stacked dielectric layers 14 and a plurality of internal electrodes 16. Further, stacked body 12 includes a first main surface 12a and a second main surface 12b opposite to each other in a stacking direction x, a first side surface 12c and a second side surface 12d opposite to each other in a width direction y orthogonal or substantially orthogonal to stacking direction x, and a first end surface 12e and a second end surface 12f opposite to each other in a length direction z orthogonal or substantially orthogonal to stacking direction x and width direction y. First main surface 12a and second main surface 12b of stacked body 12 refers to surfaces parallel or substantially parallel to a surface on which multilayer ceramic capacitor 10 is to be mounted (a mounting surface). In particular, second main surface 12b is a surface to be actually mounted on the mounting surface.

Preferably, corner portions and ridge portions of stacked body 12 are rounded. It should be noted that a corner portion is a portion where adjacent three surfaces of the stacked body meet, and a ridge portion is a portion where adjacent two surfaces of the stacked body meet. In addition, recesses and protrusions or the like may be provided partially or entirely in first main surface 12a and second main surface 12b, first side surface 12c and second side surface 12d, and first end surface 12e and second end surface 12f. Further, the dimension of stacked body 12 in length direction z is not necessarily longer than the dimension thereof in width direction y.

Although the number of stacked dielectric layers 14 is not particularly limited, it is preferably 50 or more and 1200 or less, for example, (including outer layer portions 15a described below).

Stacked body 12 includes outer layer portions 15a including a plurality of dielectric layers 14, and an inner layer portion 15b including a single or a plurality of dielectric layers 14 and a plurality of internal electrodes 16 provided thereon. Outer layer portions 15a are located on a first main surface 12a side and a second main surface 12b side of stacked body 12, and include a plurality of dielectric layers 14 located between first main surface 12a and internal electrode 16 closest to first main surface 12a, and a plurality of dielectric layers 14 located between second main surface 12b and internal electrode 16 closest to second main surface 12b. Inner layer portion 15b is a region sandwiched between outer layer portions 15a.

Although the dimensions of stacked body 12 are not particularly limited, preferably, the dimension in length direction z is about 3.0 mm or more and about 6.1 mm or less, the dimension in width direction y is about 1.4 mm or more and about 5.1 mm or less, and the dimension in stacking direction x is about 0.65 mm or more and about 3.3 mm or less, for example.

Each dielectric layer 14 can be made of a dielectric material, for example. As such a dielectric material, a dielectric ceramic including a component such as $BaTiO_3$, $CaTiO_3$, $SrTiO_3$, or $CaZrO_3$ can be used, for example. When the above dielectric material is included as a main component, a sub-component having a content smaller than that of the main component, such as an Mn compound, an Fe compound, a Cr compound, a Co compound, or an Ni compound, for example, may be added, depending on the desired characteristics of stacked body 12.

Dielectric layer 14 after firing preferably has a thickness of about 0.5 μm or more and about 10.0 μm or less, for example.

The plurality of internal electrodes 16 include a first internal electrode 16a and a second internal electrode 16b, a third internal electrode 16c and a fourth internal electrode 16d, and a fifth internal electrode 16e and a sixth internal electrode 16f.

First internal electrode 16a and second internal electrode 16b, and third internal electrode 16c and fourth internal electrode 16d are provided on dielectric layer 14 in a same plane. Fifth internal electrode 16e and sixth internal electrode 16f are provided on dielectric layer 14 in a same plane different from dielectric layer 14 on which first internal electrode 16a and second internal electrode 16b, and third internal electrode 16c and fourth internal electrode 16d are provided.

First internal electrode 16a includes a first drawn-out portion 20a with one end portion extending to first end surface 12e, a first facing portion $18a_1$ connected to first drawn-out portion 20a and overlapping with fifth internal electrode 16e on a different dielectric layer 14, and a second facing portion $18a_2$ protruding from first facing portion $18a_1$ toward second end surface 12f and having a width narrower than that of first facing portion $18a_1$ extending toward first end surface 12e. In first drawn-out portion 20a, an end portion thereof extends to first end surface 12e and is exposed. It should be noted that the width of first drawn-out portion 20a may be the same or substantially the same as the width of first facing portion $18a_1$, or the width of first drawn-out portion 20a may be narrower than the width of first facing portion $18a_1$. In addition, first internal electrode 16a may have a tapered shape such that the shape from first facing portion $18a_1$ to first drawn-out portion 20a becomes narrower toward first end surface 12e.

Second internal electrode 16b includes a second drawn-out portion 20b with one end portion extending to second end surface 12f, a third facing portion $18b_1$ connected to second drawn-out portion 20b and overlapping with sixth internal electrode 16f on a different dielectric layer 14, and a fourth facing portion $18b_2$ protruding from third facing portion $18b_1$ toward first end surface 12e and having a width narrower than that of third facing portion $18b_1$ extending toward second end surface 12f. In second drawn-out portion 20b, an end portion thereof extends to second end surface 12f and is exposed. It should be noted that the width of second drawn-out portion 20b may be the same or substantially the same as the width of third facing portion $18b_1$, or the width of second drawn-out portion 20b may be narrower than the width of third facing portion $18b_1$. In addition, second internal electrode 16b may have a tapered shape such that the shape from third facing portion $18b_1$ to second drawn-out portion 20b becomes narrower toward second end surface 12f.

Since first internal electrode 16a and second internal electrode 16b have the configurations described above, it is possible to ensure heat dissipation paths for dissipating heat at a central portion in stacked body 12 of multilayer ceramic capacitor 10, via second facing portion $18a_2$ and fourth facing portion $18b_2$, through first drawn-out portion 20a and second drawn-out portion 20b, to the outside of multilayer ceramic capacitor 10, while ensuring a high breakdown voltage design. Thus, heat dissipation properties of multilayer ceramic capacitor 10 can be improved.

Third internal electrode 16c is spaced away from first internal electrode 16a and second internal electrode 16b, and includes a fifth facing portion $18c_1$ overlapping with fifth internal electrode 16e on dielectric layer 14 different from the dielectric layer on which third internal electrode 16c is provided, and a sixth facing portion $18c_2$ overlapping with sixth internal electrode 16f on dielectric layer 14 different from the dielectric layer on which third internal electrode 16c is provided. Third internal electrode 16c has a rectangular or substantially rectangular shape, for example, and is disposed on a first side surface 12c side.

Fourth internal electrode 16d is spaced away from first internal electrode 16a and second internal electrode 16b, and includes a seventh facing portion $18d_1$ overlapping with fifth internal electrode 16e on dielectric layer 14 different from the dielectric layer on which fourth internal electrode 16d is provided, and an eighth facing portion $18d_2$ overlapping with sixth internal electrode 16f on dielectric layer 14 different from the dielectric layer on which fourth internal electrode 16d is provided. Fourth internal electrode 16d has a rectangular or substantially rectangular shape, for example, and is disposed on a second side surface 12d side.

Since third internal electrode 16c and fourth internal electrode 16d have the configurations described above, it is possible to provide a structure in which internal electrodes 16 include a plurality of divided facing portions in the inside of stacked body 12. By providing a structure including a plurality of divided facing portions as described above, a plurality of capacitor components are provided between internal electrodes 16 facing each other, and these capacitor components are connected in series. Thus, an equal or substantially equal voltage is applied to each capacitor component, and multilayer ceramic capacitor 10 has a high breakdown voltage.

Preferably, third internal electrode 16c and fourth internal electrode 16d are separated from each other, and between third internal electrode 16c and fourth internal electrode 16d, second facing portion $18a_2$ of first internal electrode 16a and fourth facing portion $18b_2$ of second internal electrode 16b are each separated from each other. Thus, it is possible to ensure the heat dissipation paths for dissipating heat at the central portion in stacked body 12 of the multilayer ceramic capacitor, via second facing portion $18a_2$ and fourth facing portion $18b_2$, through first drawn-out portion 20a and second drawn-out portion 20b, to the outside of the multilayer ceramic capacitor. Thus, heat dissipation properties of the multilayer ceramic capacitor are improved.

Fifth internal electrode 16e straddles first internal electrode 16a, third internal electrode 16c, and fourth internal electrode 16d, when viewed in plan view from first main surface 12a as shown in FIG. 2. Sixth internal electrode 16f straddles second internal electrode 16b, third internal electrode 16c, and fourth internal electrode 16d, when viewed in plan view from first main surface 12a as shown in FIG. 2.

Fifth internal electrode $16e$ includes a ninth facing portion $18e_1$ overlapping with first internal electrode $16a$ on dielectric layer $14$ different from the dielectric layer on which fifth internal electrode $16e$ is provided, a tenth facing portion $18e_2$ overlapping with third internal electrode $16c$ on dielectric layer $14$ different from the dielectric layer on which fifth internal electrode $16e$ is provided, and an eleventh facing portion $18e_3$ overlapping with fourth internal electrode $16d$ on dielectric layer $14$ different from the dielectric layer on which fifth internal electrode $16e$ is provided. In addition, fifth internal electrode $16e$ includes a region facing and overlapping with second facing portion $18a_2$ of first internal electrode $16a$ on dielectric layer $14$ different from the dielectric layer on which fifth internal electrode $16e$ is provided, between tenth facing portion $18e_2$ and eleventh facing portion $18e_3$. Fifth internal electrode $16e$ has a rectangular or substantially rectangular shape, for example, and is disposed on a first end surface $12e$ side.

Sixth internal electrode $16f$ includes a twelfth facing portion $18f_1$ overlapping with second internal electrode $16b$ on dielectric layer $14$ different from the dielectric layer on which sixth internal electrode $16f$ is provided, a thirteenth facing portion $18f_2$ overlapping with third internal electrode $16c$ on dielectric layer $14$ different from the dielectric layer on which sixth internal electrode $16f$ is provided, and a fourteenth facing portion $18f_3$ overlapping with fourth internal electrode $16d$ on dielectric layer $14$ different from the dielectric layer on which sixth internal electrode $16f$ is provided. In addition, sixth internal electrode $16f$ includes a region facing and overlapping with fourth facing portion $18b_2$ of second internal electrode $16b$ on dielectric layer $14$ different from the dielectric layer on which sixth internal electrode $16f$ is provided, between thirteenth facing portion $18f_2$ and fourteenth facing portion $18f_3$. Sixth internal electrode $16f$ has a rectangular or substantially rectangular shape, for example, and is disposed on a second end surface $12f$ side.

Since fifth internal electrode $16e$ and sixth internal electrode $16f$ have the configurations described above, it is possible to provide a structure in which internal electrodes $16$ include a plurality of divided facing portions in the inside of stacked body $12$. By providing a structure including a plurality of divided facing portions as described above, a plurality of capacitor components are provided between the internal electrodes facing each other, and these capacitor components are connected in series. Thus, an equal or substantially equal voltage is applied to each capacitor component, and the multilayer ceramic capacitor has a high breakdown voltage.

Stacked body $12$ includes side portions (W gaps) $22a$ of stacked body $12$ between first side surface $12c$ and one ends in width direction y of first facing portion $18a_1$ of first internal electrode $16a$ and third facing portion $18b_1$ of second internal electrode $16b$, and between second side surface $12d$ and the other ends in width direction y of first facing portion $18a_1$ of first internal electrode $16a$ and third facing portion $18b_1$ of second internal electrode $16b$. Further, stacked body $12$ includes end portions (L gaps) $22b$ of stacked body $12$ between first end surface $12e$ and an end portion of ninth facing portion $18e_1$ of fifth internal electrode $16e$ located on the first end surface $12e$ side, and between second end surface $12f$ and an end portion of twelfth facing portion $18f_1$ of sixth internal electrode $16f$ located on the second end surface $12f$ side.

Each internal electrode $16$ includes a suitable conductive material, such as, for example, a metal such as Ni, Cu, Ag, Pd, or Au, for example, or an alloy including one of these metals, an alloy including at least one of these metals, such as an Ag—Pd alloy. As a resin component included in a conductive paste for forming internal electrodes $16$, ethyl cellulose or acrylic resin is preferably used.

Internal electrode $16$ preferably has a thickness of about $0.2$ μm or more and about $2.0$ μm or less, for example.

External electrodes $24$ are provided on the first end surface $12e$ side and the second end surface $12f$ side of stacked body $12$. External electrodes $24$ include a first external electrode $24a$ and a second external electrode $24b$. First external electrode $24a$ is provided on first end surface $12e$ of stacked body $12$, and extends from first end surface $12e$ and covers a portion of each of first main surface $12a$, second main surface $12b$, first side surface $12c$, and second side surface $12d$. In this case, first external electrode $24a$ is electrically connected with first drawn-out portion $20a$ of first internal electrode $16a$. Preferably, first external electrode $24a$ extends to at least a portion of first main surface $12a$ or a portion of second main surface $12b$ of stacked body $12$ located on a mounting surface side. Second external electrode $24b$ is provided on second end surface $12f$ of stacked body $12$, and extends from second end surface $12f$ and covers a portion of each of first main surface $12a$, second main surface $12b$, first side surface $12c$, and second side surface $12d$. In this case, second external electrode $24b$ is electrically connected with second drawn-out portion $20b$ of second internal electrode $16b$. Preferably, second external electrode $24b$ extends to at least a portion of first main surface $12a$ or a portion of second main surface $12b$ of stacked body $12$ located on the mounting surface side.

Within stacked body $12$, first facing portion $18a_1$ of first internal electrode $16a$ faces ninth facing portion $18e_1$ of fifth internal electrode $16e$ with dielectric layer $14$ interposed therebetween, third facing portion $18b_1$ of second internal electrode $16b$ faces twelfth facing portion $18f_1$ of sixth internal electrode $16f$ with dielectric layer $14$ interposed therebetween, fifth facing portion $18c_1$ of third internal electrode $16c$ faces tenth facing portion $18e_2$ of fifth internal electrode $16e$ with dielectric layer $14$ interposed therebetween, sixth facing portion $18c_2$ of third internal electrode $16c$ faces thirteenth facing portion $18f_2$ of sixth internal electrode $16f$ with dielectric layer $14$ interposed therebetween, seventh facing portion $18d_1$ of fourth internal electrode $16d$ faces eleventh facing portion $18e_3$ of fifth internal electrode $16e$ with dielectric layer $14$ interposed therebetween, and eighth facing portion $18d_2$ of fourth internal electrode $16d$ faces fourteenth facing portion $18f_3$ of sixth internal electrode $16f$ with dielectric layer $14$ interposed therebetween, thus producing a capacitance. Thus, the capacitance can be obtained between first external electrode $24a$ to which first internal electrode $16a$ is connected and second external electrode $24b$ to which second internal electrode $16b$ is connected, and characteristics of a capacitor are exhibited.

First external electrode $24a$ includes a first base electrode layer on stacked body $12$, and a first plating layer covering the surface of the first base electrode layer. Second external electrode $24b$ includes a second base electrode layer on stacked body $12$, and a second plating layer covering the surface of the second base electrode layer.

The first base electrode layer and the second base electrode layer (hereinafter also simply referred to as the base electrode layers) each include at least one selected from a baked layer, a conductive resin layer, a thin film layer, and the like, for example.

First, a description will be provided of a case where the base electrode layers are the first base electrode layer and the second base electrode layer each defined by a baked layer. The baked layer includes glass and a metal, for example. The metal for the baked layer preferably includes at least one selected from Cu, Ni, Ag, Pd, an Ag—Pd alloy, Au, and the like, for example. Further, the glass for the baked layer preferably includes at least one selected from B, Si, Ba, Mg, Al, Li, and the like, for example. The baked layer may include a plurality of layers. The baked layer is formed by applying a conductive paste including glass and a metal to stacked body 12 and baking it. The baked layer may be fired simultaneously with dielectric layers 14 and internal electrodes 16, or may be baked after dielectric layers 14 and internal electrodes 16 are fired.

The thickness of the baked layers at central portions in a height direction that are the base electrode layers located on first end surface 12e and second end surface 12f is preferably about 75 μm or more and about 235 μm or less, for example. In addition, when the base electrode layers are provided on the surfaces of first main surface 12a and second main surface 12b, and first side surface 12c and second side surface 12d, the thickness of the baked layers at central portions in length direction z that are the first base electrode layer and the second base electrode layer located on the surfaces of first main surface 12a and second main surface 12b, and first side surface 12c and second side surface 12d is preferably about 30 μm or more and about 125 μm or less, for example.

Next, a description will be provided of a case where the base electrode layers are the first base electrode layer and the second base electrode layer each defined by a conductive resin layer. The conductive resin layer may be provided on the surface of the baked layer to cover the baked layer, or may be directly provided on the surfaces of stacked body 12. In addition, the conductive resin layer may include a plurality of layers. The conductive resin layer includes a thermosetting resin and a metal, for example. Since the conductive resin layer includes a thermosetting resin, it is more flexible than a conductive layer made of a plating film or a fired conductive paste. Accordingly, even when a physical impact or an impact resulting from a heat cycle is applied to the multilayer ceramic capacitor, the conductive resin layer defines and functions as a buffer layer, and prevents a crack in the multilayer ceramic capacitor.

As the metal included in the conductive resin layer, Ag, Cu, or an alloy thereof, for example, can preferably be used. In addition, metal powder whose surface is coated with Ag can be used. When the metal powder whose surface is coated with Ag is used, it is preferable to use Cu or Ni, for example, as the metal powder. In addition, Cu subjected to oxidation prevention treatment can also be used. In particular, it is preferable to use, for example, Ag-coated conductive metal powder as the metal included in the conductive resin layer, because Ag has the lowest specific resistance among metals and thus is suitable for an electrode material, and also because Ag is a noble metal and thus is not oxidized and has a high weather resistance. It should be noted that it is preferable to use, for example, an Ag-coated metal as the metal included in the conductive resin layer, because it becomes possible to use an inexpensive metal as a base material, while maintaining the characteristics of Ag described above.

The metal included in the conductive resin layer preferably has a content of, for example, about 35 vol % or more and about 75 vol % or less with respect to the volume of the entire conductive resin. The shape of the metal (conductive filler) included in the conductive resin layer is not particularly limited. As the conductive filler, metal powder having a spherical shape, a flat shape, or the like, for example, can be used, and it is preferable to use a mixture of metal powder having a spherical shape and metal powder having a flat shape, for example. The average particle size of the metal (conductive filler) included in the conductive resin layer is not particularly limited. The average particle size of the conductive filler may preferably be about 0.3 μm or more and about 10 μm or less, for example. The metal (conductive filler) included in the conductive resin layer is mainly involved in energization properties of the conductive resin layer. Specifically, an energization path is provided inside the conductive resin layer due to contact between conductive fillers.

As the resin in the conductive resin layer, various known thermosetting resins such as an epoxy resin, a phenol resin, a urethane resin, a silicone resin, and a polyimide resin, for example, can be used. Among them, an epoxy resin, for example, which has excellent heat resistance, moisture resistance, adhesiveness, and the like, is one of the most suitable resins. The resin included in the conductive resin layer preferably has a content of, for example, about 25 vol % or more and about 65 vol % or less with respect to the volume of the entire conductive resin. In addition, the conductive resin layer preferably includes a curing agent, together with the thermosetting resin. When an epoxy resin is used as a base resin, various known compounds such as a phenol resin, an amine-based compound, an acid anhydride-based compound, and an imidazole-based compound, for example, can be used as a curing agent for the epoxy resin.

The thickness of the conductive resin layers at the central portions in height direction x that are the base electrode layers located on first end surface 12e and second end surface 12f is preferably about 10 μm or more and about 200 μm or less, for example. In addition, when the base electrode layers are provided on the surfaces of first main surface 12a and second main surface 12b, and first side surface 12c and second side surface 12d, the thickness of the conductive resin layers at the central portions in length direction z that are the base electrode layers located on the surfaces of first main surface 12a and second main surface 12b, and first side surface 12c and second side surface 12d is preferably about 5 μm or more and about 50 μm or less, for example.

In addition, when the base electrode layers are each a thin film layer, the thin film layer is preferably, for example, a layer of about 1 μm or less formed by a thin film formation method such as a sputtering method or a vapor deposition method, for example, and including deposited metal particles.

In addition, the first plating layer and the second plating layer (hereinafter also simply referred to as the plating layers) each include at least one selected from Cu, Ni, Sn, Ag, Pd, an Ag—Pd alloy, Au, and the like, for example. Each plating layer may include a plurality of layers. In this case, the plating layer preferably has a two-layer structure including an Ni plating layer and an Sn plating layer, for example. By providing the Ni plating layer to cover the surface of the base electrode layer, the base electrode layer is prevented from being eroded by solder used for mounting when multilayer ceramic capacitor 10 is mounted. In addition, by providing the Sn plating layer on the surface of the Ni plating layer, wettability of the solder used for mounting is improved when multilayer ceramic capacitor 10 is mounted, and thus multilayer ceramic capacitor 10 can be easily mounted.

The thickness of each plating layer is preferably about 1 μm or more and about 15 μm or less, for example.

It should be noted that each external electrode 24 may include only a plating layer, without providing a base electrode layer. A description will be provided below of a structure in which a plating layer is provided without providing a base electrode layer. In each of first external electrode 24a and second external electrode 24b, a plating layer may be directly provided on the surfaces of stacked body 12 without providing a base electrode layer. That is, multilayer ceramic capacitor 10 may have a structure including a plating layer electrically connected to internal electrodes 16. In such a case, the plating layer may be formed after a catalyst is provided on the surfaces of stacked body 12 as pretreatment. Preferably, the plating layer includes a lower layer plating electrode provided on the surfaces of stacked body 12, and an upper layer plating electrode provided on the surface of the lower layer plating electrode. Preferably, each of the lower layer plating electrode and the upper layer plating electrode includes at least one metal selected from Cu, Ni, Sn, Pb, Au, Ag, Pd, Bi, Zn, and the like, or an alloy including the metal, for example. The lower layer plating electrode is preferably made of Ni, for example, which has solder barrier performance, and the upper layer plating electrode is preferably made of Sn or Au, for example, which has a good solder wettability. In addition, when internal electrodes 16 are made of Ni, for example, the lower layer plating electrode is preferably made of Cu, for example, which has a good bondability with Ni. It should be noted that the upper layer plating electrode may be provided if necessary, and each of first external electrode 24a and second external electrode 24b may be defined by only the lower layer plating electrode. In the plating layer, the upper layer plating electrode may define and function as the outermost layer, or another plating electrode may be provided on the surface of the upper layer plating electrode. The thickness of each plating layer provided without providing a base electrode layer is preferably about 1 μm or more and about 15 μm or less, for example. Preferably, the plating layer does not include glass. Preferably, the ratio of metal per unit volume of the plating layer is about 99 vol % or more, for example.

The dimension in length direction z of multilayer ceramic capacitor 10 including stacked body 12, first external electrode 24a, and second external electrode 24b is defined as an L dimension, the dimension in stacking direction x of multilayer ceramic capacitor 10 including stacked body 12, first external electrode 24a, and second external electrode 24b is defined as a T dimension, and the dimension in width direction y of multilayer ceramic capacitor 10 including stacked body 12, first external electrode 24a, and second external electrode 24b is defined as a W dimension. Preferably, for example, multilayer ceramic capacitor 10 has L dimension in length direction z of about 3.10 mm or more and about 6.20 mm or less, W dimension in width direction y of about 1.50 mm or more and about 3.40 mm or less, and T dimension in stacking direction x of about 0.75 mm or more and about 5.20 mm or less.

Multilayer ceramic capacitor 10 shown in FIG. 1 includes second facing portion $18a_2$ and fourth facing portion $18b_2$ that extend portions of first internal electrode 16a and second internal electrode 16b that are to extend to the outside of stacked body 12, to the central portion of stacked body 12, while ensuring the high breakdown voltage design. Thus, it is possible to ensure the heat dissipation paths for dissipating heat at the central portion in stacked body 12 of the multilayer ceramic capacitor, via second facing portion $18a_2$ and fourth facing portion $18b_2$, through first drawn-out portion 20a and second drawn-out portion 20b, to the outside of the multilayer ceramic capacitor. Accordingly, heat dissipation properties are improved, while ensuring the high breakdown voltage design. As a result, a decrease in the reliability of multilayer ceramic capacitor 10 is able to be reduced or prevented.

In addition, in multilayer ceramic capacitor 10 shown in FIG. 1, third internal electrode 16c and fourth internal electrode 16d are separated from each other, and between third internal electrode 16c and fourth internal electrode 16d, second facing portion $18a_2$ of first internal electrode 16a and fourth facing portion $18b_2$ of second internal electrode 16b are separated from each other. Since a plurality of heat dissipation paths can be ensured, heat generated at the central portion of stacked body 12 can be dissipated more efficiently. As a result, a decrease in the reliability of multilayer ceramic capacitor 10 is able to be further reduced or prevented.

Further, in multilayer ceramic capacitor 10 shown in FIG. 1, fifth internal electrode 16e includes ninth facing portion $18e_1$ overlapping with first internal electrode 16a on dielectric layer 14 different from the dielectric layer on which fifth internal electrode 16e is provided, tenth facing portion $18e_2$ overlapping with third internal electrode 16c on dielectric layer 14 different from the dielectric layer on which fifth internal electrode 16e is provided, and eleventh facing portion $18e_3$ overlapping with fourth internal electrode 16d on dielectric layer 14 different from the dielectric layer on which fifth internal electrode 16e is provided. Sixth internal electrode 16f includes twelfth facing portion $18f_1$ overlapping with second internal electrode 16b on dielectric layer 14 different from the dielectric layer on which sixth internal electrode 16f is provided, thirteenth facing portion $18f_2$ overlapping with third internal electrode 16c on dielectric layer 14 different from the dielectric layer on which sixth internal electrode 16f is provided, and fourteenth facing portion $18f_3$ overlapping with fourth internal electrode 16d on dielectric layer 14 different from the dielectric layer on which sixth internal electrode 16f is provided. By providing a structure in which internal electrodes 16 include a plurality of divided facing portions in the inside of stacked body 12, a plurality of capacitor components are provided between the internal electrodes facing each other, and these capacitor components can be connected in series. Thus, an equal or substantially equal voltage is applied to each capacitor component, and multilayer ceramic capacitor 10 can have a high breakdown voltage.

2. Method for Manufacturing Multilayer Ceramic Capacitor

Next, a non-limiting example of a method for manufacturing the multilayer ceramic capacitor according to a preferred embodiment of the present invention will be described.

First, dielectric sheets and a conductive paste for the internal electrodes are prepared. A binder and a solvent are included in the dielectric sheets and the conductive paste for the internal electrodes, and known organic binder and organic solvent can be used.

Then, the conductive paste for the internal electrodes is printed on the dielectric sheets by a screen printing method, a gravure printing method, ink jet printing, or the like, for example, and thus the internal electrode pattern is formed.

Subsequently, a predetermined number of dielectric sheets for outer layers, on which the internal electrode pattern is not formed, are stacked, then the dielectric sheets on which the internal electrode pattern is formed are successively stacked thereon, and then another predetermined number of dielectric sheets on which the internal electrode pattern is not formed are stacked thereon, to fabricate a multilayer sheet.

Then, the multilayer sheet is compression-bonded in the stacking direction by, for example, isostatic pressing, to fabricate a multilayer block.

Thereafter, the multilayer block is cut to have predetermined shape dimensions, and thus raw stacked body chips are cut out. At this time, the stacked body chips may be subjected to barrel finishing or the like to round corner portions and ridge portions of the stacked body chips.

Subsequently, the cut-out raw stacked body chips are fired to fabricate stacked bodies in which the first internal electrode extends to the first end surface and the second internal electrode extends to the second end surface. It should be noted that the firing temperature of the raw stacked body chips is preferably about 900° C. or more and about 1400° C. or less, for example, although it depends on the ceramic material and the material for the conductive paste for the internal electrodes.

In order to form the baked layer of external electrode 24, for example, a conductive paste for the external electrodes including a glass component and a metal is applied to an exposed portion of first drawn-out portion 20a of first internal electrode 16a exposed from first end surface 12e of stacked body 12, by a method such as dipping, for example, and is baked. Thus, the first base electrode layer is formed. Similarly, in order to form the baked layer of external electrode 24, for example, the conductive paste for the external electrodes including a glass component and a metal is applied to an exposed portion of second drawn-out portion 20b of second internal electrode 16b exposed from second end surface 12f of stacked body 12, by a method such as dipping, for example, and is baked. Thus, the second base electrode layer is formed. The temperature of baking treatment is preferably about 700° C. or more and about 900° C. or less, for example.

It should be noted that, when the base electrode layers are each formed of a conductive resin layer, the conductive resin layer can be formed by the method described below. It should be noted that the conductive resin layer may be formed on the surface of the baked layer, or the conductive resin layer alone may be directly formed on the surfaces of stacked body 12 without forming a baked layer. As a method for forming the conductive resin layer, a conductive resin paste including a thermosetting resin and a metal component is applied to the surface of the baked layer or the surfaces of stacked body 12, and heat treatment is performed at a temperature of about 250° C. or more and about 550° C. or less, for example, to thermoset the resin. Thus, the conductive resin layer is formed. Preferably, the atmosphere during heat treatment on this occasion is an $N_2$ atmosphere, for example. In addition, in order to prevent scattering of the resin and to prevent oxidation of various metal components, oxygen concentration is preferably about 100 ppm or less, for example.

In addition, when the base electrode layers are each formed of a thin film layer, each base electrode layer can be formed by a thin film formation method such as a sputtering method or a vapor deposition method, for example. The base electrode layer formed of a thin film layer is a layer of about 1 μm or less, for example, including deposited metal particles.

Further, the plating layer may be provided on exposed portions of internal electrodes 16 of stacked body 12, without providing a base electrode layer. In that case, the plating layer is formed by the method described below.

Plating treatment is performed on first end surface 12e and second end surface 12f of stacked body 12 to form the lower layer plating electrode on the exposed portions of internal electrodes 16. When plating treatment is performed, any of electrolysis plating and electroless plating may be used. However, electroless plating requires pretreatment using a catalyst or the like to improve a plating deposition rate, and thus has a disadvantage that its process is complicated. Therefore, it is usually preferable to use electrolysis plating. As a plating method, barrel plating is preferably used. In addition, the upper layer plating electrode may be similarly formed on the surface of the lower layer plating electrode, if necessary.

Thereafter, the plating layer is formed on the surface of the base electrode layer, the surface of the conductive resin layer, or the surface of the lower layer plating electrode, the surface of the upper layer plating electrode, and thus external electrode 24 is formed. In multilayer ceramic capacitor 10 shown in FIG. 1, an Ni plating layer and an Sn plating layer, for example, are preferably formed as the plating layer on the baked layer. The Ni plating layer and the Sn plating layer are successively formed by a barrel plating method, for example.

As described above, multilayer ceramic capacitor 10 shown in FIG. 1 is manufactured.

3. Experiment Examples

Next, in order to confirm the advantageous effects of the multilayer ceramic capacitor according to a preferred embodiment of the present invention described above, multilayer ceramic capacitors were manufactured, and an experiment for measuring heat generation temperatures was conducted.

(1) Specifications of Sample in Example

First, a multilayer ceramic capacitor having the following specifications was fabricated according to the method for manufacturing the multilayer ceramic capacitor described above.

Size L×W×T of the multilayer ceramic capacitor (including design values): about 3.2 mm×about 3.2 mm×about 2.5 mm Material for dielectric layers: $SrZrO_3$ Thickness of dielectric layers: about 5 μm Material for internal electrodes: Ni Internal electrode pattern: patterns shown in FIGS. 11 and 12

Capacitance: about 4.7 nF

Rated voltage: about 630 V

Structure of external electrodes

Figure 16:
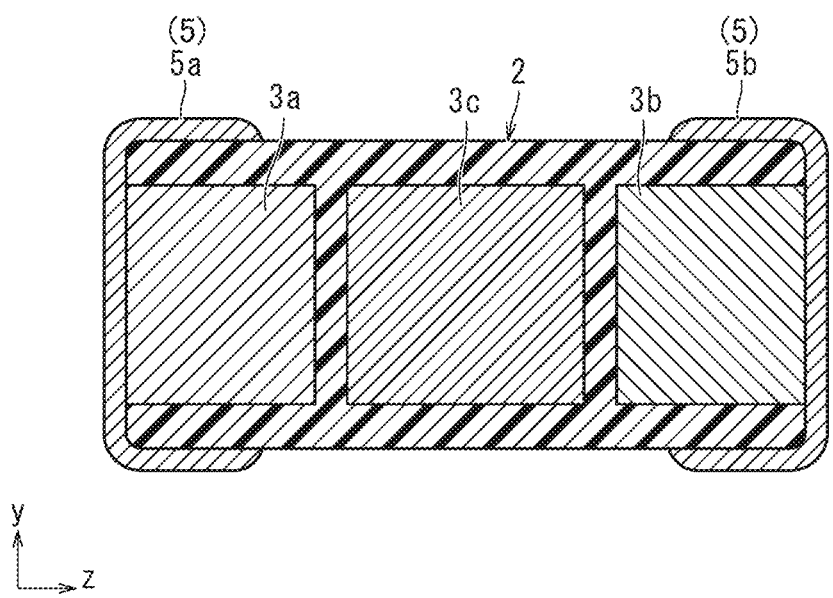
FIG. 16 is a cross sectional view of the multilayer ceramic capacitor shown in FIG. 15, taken along a line XVI-XVI.
Figure 17:
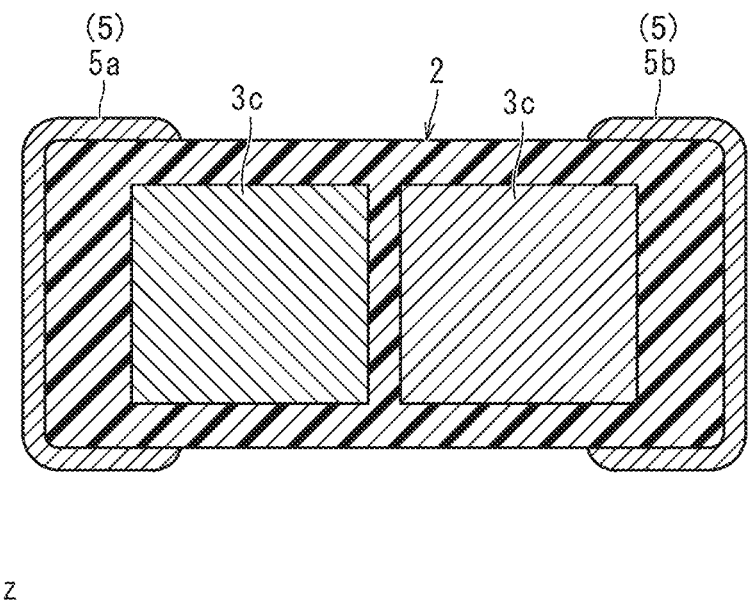
FIG. 17 is a cross sectional view of the multilayer ceramic capacitor shown in FIG. 15, taken along a line XVII-XVII.

Base electrode layer: An electrode containing a conductive metal (Cu) and a glass component Plating layer: two-layer structure including an Ni plating layer and an Sn plating layer (2) Specifications of Sample in Comparative Example A multilayer ceramic capacitor used for a Comparative Example had the same or substantially the same specifications as those of the multilayer ceramic capacitor used for the Example, except that patterns shown in FIGS. 16 and 17 were provided as the internal electrode pattern.

Figure 15:
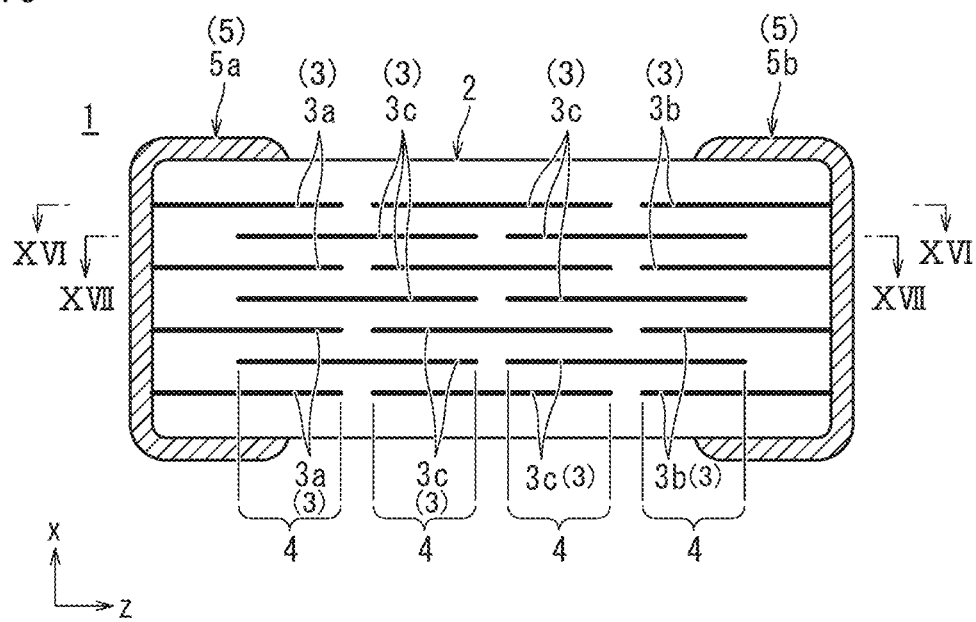
FIG. 15 is a cross sectional view of the multilayer ceramic capacitor shown in FIG. 14, taken along a line XV-XV.

More specifically, as shown in FIGS. 14 to 17, a multilayer ceramic capacitor 1 used for the Comparative Example includes, inside a stacked body 2, a first internal electrode 3a and a second internal electrode 3b, as internal electrodes 3. In addition, inside stacked body 2, a floating internal electrode 3c that does not extend to either of end surfaces of stacked body 2 is provided. Accordingly, multilayer ceramic capacitor 1 has a structure in which a plurality of divided facing portions 4 are provided due to floating internal electrode 3c, and the structure has a 4-part structure as shown in FIG. 15. Multilayer ceramic capacitor 1 includes external electrodes 5. External electrodes include a first external electrode 5a and a second external electrode 5b. First external electrode 5a is electrically connected with first internal electrode 3a, and second external electrode 5b is electrically connected with second internal electrode 3b.

(3) Method for Measuring Heat Generation Temperature

Each fabricated multilayer ceramic capacitor was mounted on a mounting substrate, a thermocouple was attached to the first main surface (top surface) of the multilayer ceramic capacitor, and the multilayer ceramic capacitor was placed in a constant temperature bath. Then, after the ambient temperature reached about 100° C., a predetermined voltage (about 223 Vrms/about 100 kHz) was applied to the multilayer ceramic capacitor, and the temperature of the surface of the multilayer ceramic capacitor was measured. Then, heat generation temperatures of the multilayer ceramic capacitors were confirmed in the Example and the Comparative Example, and a temperature suppression ratio relative to the Comparative Example was calculated. It should be noted that the temperature suppression ratio was calculated by (the increasing temperature of the sample in the Example−the increasing temperature of the sample in the Comparative Example)/the increasing temperature of the sample in the Comparative Example×100.

Table 1 shows the results of the evaluation.

TABLE 1

| | Temperature Suppression Ratio of Multilayer Ceramic Capacitor |
|---|---|
| Example | −6.7% |
| Comparative Example | — |

(4) Result of Experiment

Based on the measuring method described above, when the ambient temperature was about 100° C., the temperature of the sample in accordance with the Example increased by about 15.4° C., and the temperature of the sample in accordance with the Comparative Example increased by about 16.5° C. Therefore, the temperature suppression ratio was −6.7%. Thus, it was confirmed that the heat generation temperature is reduced in the multilayer ceramic capacitor in accordance with the Example, when compared with the multilayer ceramic capacitor in accordance with the Comparative Example, as shown in Table 1.

From the above results, it was confirmed that, with the configuration of the internal electrode pattern in the multilayer ceramic capacitor according to the Example of a preferred embodiment of the present invention, the heat generation temperature can be reduced, when compared with a multilayer ceramic capacitor having a configuration of a conventional internal electrode pattern. Therefore, by providing the configuration of the internal electrode pattern according to preferred embodiments of the present invention, the multilayer ceramic capacitor includes the second facing portion that extends a portion of the first internal electrode extending to the outside of the stacked body, to the central portion of the stacked body, and the fourth facing portion that extends a portion of the second internal electrode extending to the outside of the stacked body, to the central portion of the stacked body, while ensuring the high breakdown voltage design. Thus, it is possible to ensure a heat dissipation path from the second facing portion to the first drawn-out portion, and a heat dissipation path from the fourth facing portion to the second drawn-out portion. Accordingly, heat dissipation properties can be improved, while ensuring the high breakdown voltage design. As a result, a decrease in the reliability of the multilayer ceramic capacitor is able to be reduced or prevented.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A multilayer ceramic capacitor comprising:
a stacked body including a plurality of stacked dielectric layers and a plurality of stacked internal electrodes, and including a first main surface and a second main surface opposite to each other in a stacking direction, a first side surface and a second side surface opposite to each other in a width direction orthogonal or substantially orthogonal to the stacking direction, and a first end surface and a second end surface opposite to each other in a length direction orthogonal or substantially orthogonal to the stacking direction and the width direction;
a first external electrode on the first end surface; and
a second external electrode on the second end surface; wherein
the plurality of internal electrodes include a first internal electrode and a second internal electrode, a third internal electrode and a fourth internal electrode, and a fifth internal electrode and a sixth internal electrode;
the first internal electrode and the second internal electrode, and the third internal electrode and the fourth internal electrode are provided on a dielectric layer in a same plane;
the fifth internal electrode and the sixth internal electrode are provided on a dielectric layer in a same plane different from the dielectric layer on which the first internal electrode and the second internal electrode, and the third internal electrode and the fourth internal electrode are provided;
the first internal electrode includes a first drawn-out portion with one end portion extending to the first end surface, a first facing portion connected to the first drawn-out portion and overlapping with the fifth internal electrode on the different dielectric layer, and a second facing portion extending from the first facing portion toward the second end surface and having a width narrower than that of the first facing portion;
the second internal electrode includes a second drawn-out portion with one end portion extending to the second end surface, a third facing portion connected to the second drawn-out portion and overlapping with the sixth internal electrode on the different dielectric layer, and a fourth facing portion extending from the third facing portion toward the first end surface and having a width narrower than that of the third facing portion;
the third internal electrode is spaced away from the first internal electrode and the second internal electrode, and includes a fifth facing portion overlapping with the fifth internal electrode on the dielectric layer different from the dielectric layer on which the third internal electrode is provided, and a sixth facing portion overlapping with the sixth internal electrode on the dielectric layer different from the dielectric layer on which the third internal electrode is provided;

the fourth internal electrode is spaced away from the first internal electrode and the second internal electrode, and includes a seventh facing portion overlapping with the fifth internal electrode on the dielectric layer different from the dielectric layer on which the fourth internal electrode is provided, and an eighth facing portion overlapping with the sixth internal electrode on the dielectric layer different from the dielectric layer on which the fourth internal electrode is provided;

the fifth internal electrode straddles the first internal electrode, the third internal electrode, and the fourth internal electrode;

the sixth internal electrode straddles the second internal electrode, the third internal electrode, and the fourth internal electrode; and the fifth internal electrode and the sixth internal electrode are separated from each other.

2. The multilayer ceramic capacitor according to claim 1, wherein the third internal electrode and the fourth internal electrode are separated from each other; and between the third internal electrode and the fourth internal electrode, the second facing portion of the first internal electrode and the fourth facing portion of the second internal electrode are each separated from each other.

3. The multilayer ceramic capacitor according to claim 1, wherein the fifth internal electrode includes a ninth facing portion overlapping with the first internal electrode on the dielectric layer different from the dielectric layer on which the fifth internal electrode is provided, a tenth facing portion overlapping with the third internal electrode on the dielectric layer different from the dielectric layer on which the fifth internal electrode is provided, and an eleventh facing portion overlapping with the fourth internal electrode on the dielectric layer different from the dielectric layer on which the fifth internal electrode is provided; and the sixth internal electrode includes a twelfth facing portion overlapping with the second internal electrode on the dielectric layer different from the dielectric layer on which the sixth internal electrode is provided, a thirteenth facing portion overlapping with the third internal electrode on the dielectric layer different from the dielectric layer on which the sixth internal electrode is provided, and a fourteenth facing portion overlapping with the fourth internal electrode on the dielectric layer different from the dielectric layer on which the sixth internal electrode is provided.

4. The multilayer ceramic capacitor according to claim 1, wherein the stacked body has a rectangular or substantially rectangular shape.

5. The multilayer ceramic capacitor according to claim 1, wherein corner portions and ridge portions of the stacked body are rounded.

6. The multilayer ceramic capacitor according to claim 1, wherein the plurality of dielectric layers include 50 or more and 1200 or less layers.

7. The multilayer ceramic capacitor according to claim 1, wherein the stacked body has a dimension in the length direction of about 3.0 mm or more and about 6.1 mm or less, a dimension in the width direction of about 1.4 mm or more and about 5.1 mm or less, and a dimension in the stacking direction of about 0.65 mm or more and about 3.3 mm or less.

8. The multilayer ceramic capacitor according to claim 1, wherein each of the plurality of dielectric layers includes at least one of $BaTiO_3$, $CaTiO_3$, $SrTiO_3$, or $CaZrO_3$ as a main component.

9. The multilayer ceramic capacitor according to claim 8, wherein each of the plurality of dielectric layers further includes at least one of an Mn compound, an Fe compound, a Cr compound, a Co compound, or an Ni compound as a sub-component.

10. The multilayer ceramic capacitor according to claim 1, wherein each of the plurality of dielectric layers has a thickness about 0.5 μm or more and about 10.0 μm or less.

11. The multilayer ceramic capacitor according to claim 1, wherein each of the plurality of internal electrodes includes at least one of Ni, Cu, Ag, Pd, or Au, or an alloy including at least one of Ni, Cu, Ag, Pd, or Au.

12. The multilayer ceramic capacitor according to claim 1, wherein each of the plurality of internal electrodes has a thickness of about 0.2 μm or more and about 2.0 μm or less.

13. The multilayer ceramic capacitor according to claim 1, wherein each of the first and second external electrodes includes a base electrode layer and a plating layer.

14. The multilayer ceramic capacitor according to claim 13, wherein the base layer includes at least one of a baked layer, a conductive resin layer, or a thin film layer.

15. The multilayer ceramic capacitor according to claim 14, wherein the base layer includes a baked layer including at least one of Cu, Ni, Ag, Pd, an Ag—Pd alloy, or Au.

16. The multilayer ceramic capacitor according to claim 15, wherein the baked layer has a thickness in a central portion thereof of about 75 μm or more and about 235 μm or less.

17. The multilayer ceramic capacitor according to claim 13, wherein the plating layer includes a Ni plating layer covering the base layer, and a Sn plating layer on the Ni plating layer.

* * * * *